United States Patent [19]
Aoki

[11] 3,784,348
[45] Jan. 8, 1974

[54] INJECTION BLOW-MOLDING APPARATUS

[76] Inventor: Katashi Aoki, 6037, Oaza Minamijo, Sakahi-machi, Sakaki, Japan

[22] Filed: Sept. 25, 1972

[21] Appl. No.: 292,222

[30] Foreign Application Priority Data
Sept. 29, 1971 Japan.............................. 46/77631
Nov. 12, 1971 Japan.............................. 46/90413
Nov. 13, 1971 Japan.............................. 46/90728
Nov. 19, 1971 Japan............................ 46/108338

[52] U.S. Cl. ............ 425/324 B, 264/97, 425/242 B, 425/246, 425/DIG. 209, 425/DIG. 211, 425/DIG. 213
[51] Int. Cl. ............................................ B29c 5/06
[58] Field of Search ............ 425/242 B, 249, 387 B, 425/DIG. 209, DIG. 213, DIG. 203, DIG. 211

[56] References Cited
UNITED STATES PATENTS
3,609,803  10/1971  Fattori................... 425/DIG. 209 X
3,412,186  11/1968  Piotrowski............................ 264/89
3,441,982  5/1969   Sagara ................... 425/DIG. 209 X
3,596,315  8/1971   Yoshikawa............. 425/DIG. 213 X Primary Examiner—J. Spencer Overholser
Assistant Examiner—David B. Smith

[57] ABSTRACT

An injection blow-molding apparatus comprising a core mounting pedestal having vertically and horizontally directed surfaces for mounting molding cores each having a blowing hole therethrough, a rotating device for rotating the core mounting pedestal around a bisector of an apex angle formed by said two surfaces so that the molding cores mounted on the pedestal are thereby shifted between two symmetrical positions angularly spaced apart by 180°, a hydraulic device for shifting the core mounting pedestal forwardly and backwardly, a parison forming metal mold for receiving the horizontally disposed molding core and a blow-molding metal mold for receiving the vertically disposed molding core together with a parison formed thereon, another hydraulic device for opening, closing, and clamping said metal molds, and an injection device nozzle touching the parison forming metal mold.

8 Claims, 17 Drawing Figures

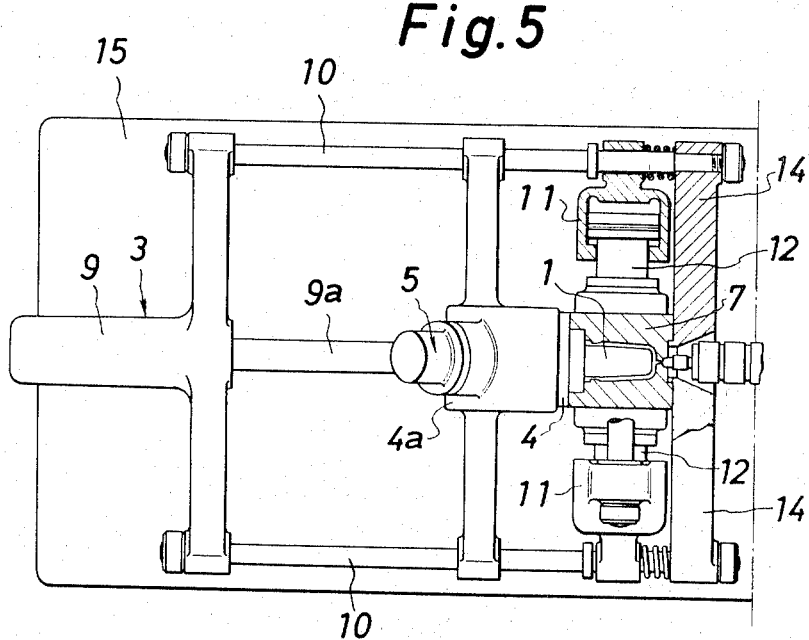
Fig.5
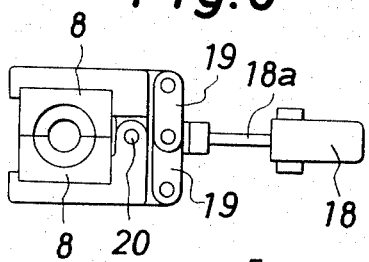
Fig.6
Fig.7
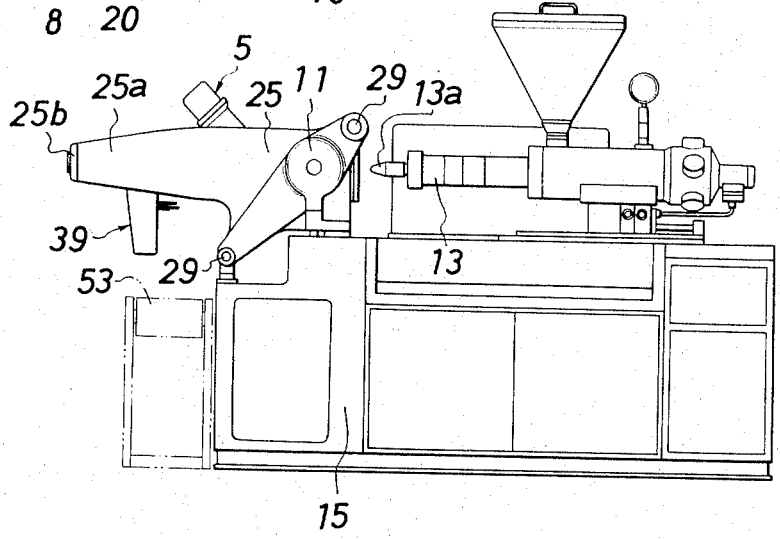

INJECTION BLOW-MOLDING APPARATUS

BACKGROUND OF THE INVENTION

This invention relates to an injection molding device, and more particularly to a blow-molding type thereof wherein parisons formed by injecting a synthetic resin are thereafter blown into hollow products such as bottles.

In a blow molding type injection molding apparatus as mentioned above, if a parison extended horizontally is tried to be blown into a hollow product, the material of the parison which is still in a semifluid condition tends to flow from the upper part of the parison to the lower part thereof, and the parison weakened at the upper part would thus be broken at the upper part, whereby uniform blowing of the parison is made impossible.

However, if the parison is disposed vertically, the flow of the material, if any, will be from the upper periphery to the bottom of the parison, resulting a uniform distribution of the wall thickness around its center line despite of some difference in the thickness between the upper part and the lower part of the parison, whereby the parison can be blown uniformly and the above described difficulty can be thereby eliminated.

Although it is found that the vertical disposition of the parison is advantageous over the horizontal disposition, as described above, it has been heretofore difficult to dispose mere a metal mold used for blowing the parison vertically leaving the metal mold for forming the parison in the horizontal disposition, because the two metal molds are mutually closely related in a mechanism.

Furthermore, an arrangement wherein the two kinds of the metal molds are both disposed vertically has been found to be not advantageous, because a serious difficulty exists in the construction of an interconnecting mechanism between the parison forming metal mold and the injection apparatus.

SUMMARY OF THE INVENTION

Therefore, a primary object of the present invention is to provide an injection blow-molding apparatus wherein a parison forming metal mold can be disposed horizontally and a blow-molding metal mold can be disposed vertically, and is provided a hydraulically rotatable core mounting pedestal which can change the positions of molding cores regardless of that these metal molds are not disposed parallelly in the same plane.

Another object of the invention is to provide an injection blow-molding apparatus wherein a parison forming metal mold can be disposed horizontally and a blow-molding metal mold can be disposed vertically, and is provided means for mounting molding cores and the metal molds in such a manner that the molding cores are aligned with the respective metal molds despite of the fact that these two metal molds are not parallelly disposed at the same height.

Still another object of the invention is to provide an injection blow-molding apparatus wherein is included a mold clamping device which comprises mold clamping plates and mold clamping rams, and the strokes of the mold clamping rams can be automatically equalized without requiring any special equalizing procedure by simply advancing the mold clamping rams prior to the attachment of the metal molds.

Still another object of the present invention is to provide an injection blow-molding apparatus wherein is provided a device for removing the product thus blow-molded in the metal mold from the molding core assuringly and for delivering the product on a belt conveyor or the like.

These and other objects of the present invention can be achieved by an injection blow-molding apparatus which comprises a core mounting pedestal having two surfaces for mounting molding cores horizontally and vertically and still another surface perpendicular to the bisector of a right-angled apex of the triangular core-mounting pedestal, a rotating device fixed to said third surface of the pedestal for rotating the pedestal electrically or hydraulically through 180° around an axis formed by the bisector thereby to interchange the positions of the horizontally and vertically mounted molding cores between each other, a parison forming metal mold for receiving the horizontally disposed molding core, and a blow-molding metal mold for receiving the vertically disposed molding core together with a parison formed thereon.

In the blow-molding apparatus described above, since a parison is formed when a molding core is disposed horizontally and the parison thus formed on the molding core is blow-molded when the parison together with the molding core is rotated to the vertical position, the relationship between the parison forming metal mold and the injection device included in the blow-molding apparatus is equivalent to that in any of the conventional blow-molding apparatuses.

Furthermore, since the blow-molding process is carried out for the vertically disposed parison as described above, all of the drawbacks of the convention blow-molding apparatuses can be substantially eliminated.

The nature, principle, and utility of the present invention will be more clearly understood from the following detailed description of the invention when read in conjunction with the accompanying drawings wherein like parts are designated by like reference numerals.

BRIEF DESCRIPTION OF THE DRAWINGS

In the drawings:

FIG. 5 is a fragmental plan view, partly in section, showing an example of the injection blow-molding apparatus of the first embodiment of the invention;

FIG. 6 is a fragmental plan view of a blow-molding metal mold and an opening device thereof;

FIG. 7 is an elevational view showing another example of the injection blow-molding apparatus entirely, which constitutes a second embodiment of the present invention;

Figures 10, 11:
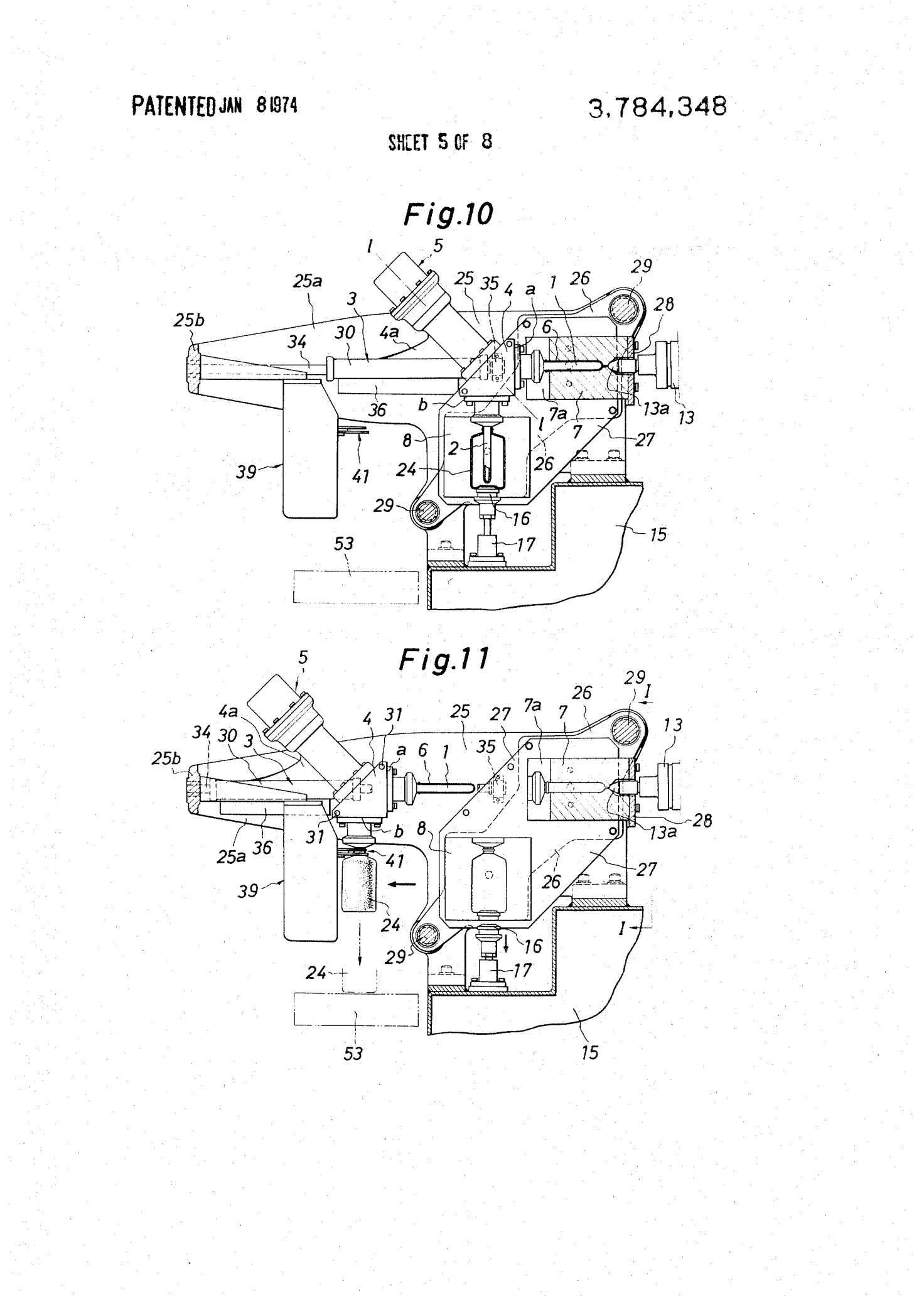

FIG. 10 is a fragmental elevational view, partly in section, showing an embodiment shown in FIG. 7 wherein a parison forming process and a blow-molding process are carried out simultaneously;

FIG. 11 is a fragmental elevational view, partly in section, of an embodiment shown in FIG. 7 wherein both metal molds are opened and the pedestal for mounting the molding cores is retracted;

DETAILED DESCRIPTION OF THE INVENTION

Figure 1:
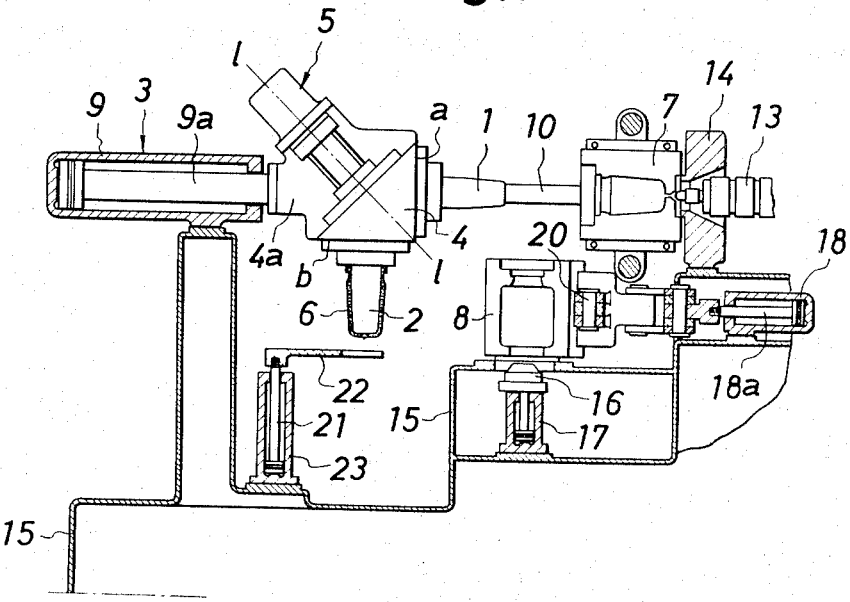
FIG. 1 is a fragmental elevational view, partly in section, showing an example of injection blow-molding apparatus constituting a first embodiment of the present invention.
Figure 2:
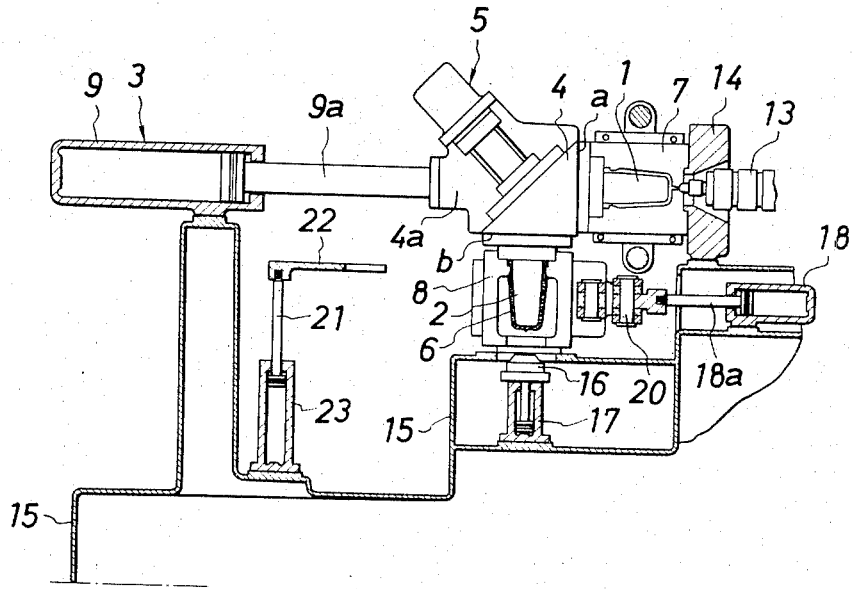
FIG. 2 is a fragmental elevational view, partly in section, showing the embodiment shown in FIG. 1, wherein a parison formed on a molding core is inserted in a blow-molding metal mold.
Figure 3:
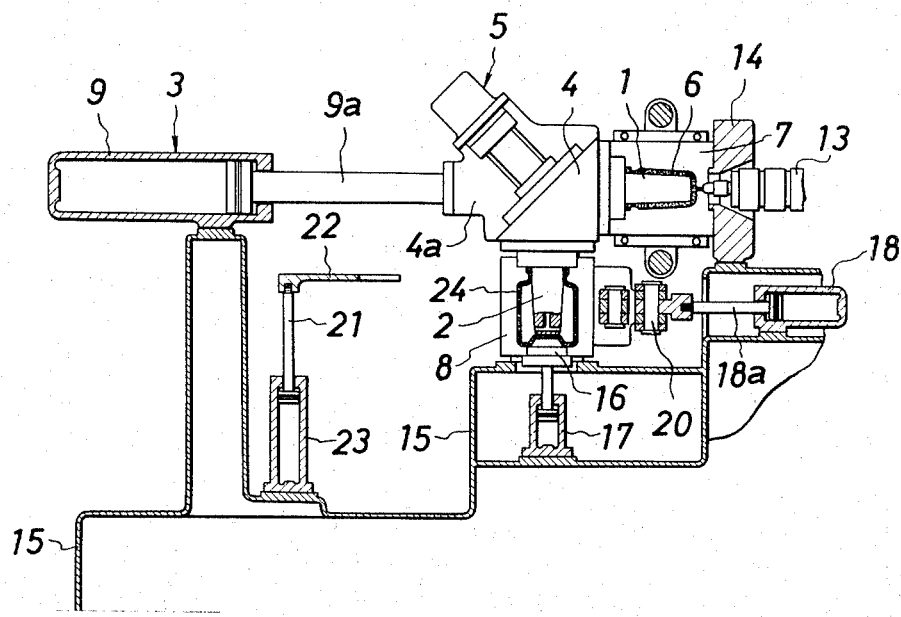
FIG. 3 is a view equivalent to FIG. 1, wherein a parison molding process and a blow-molding process are carried out simultaneously.
Figure 4:
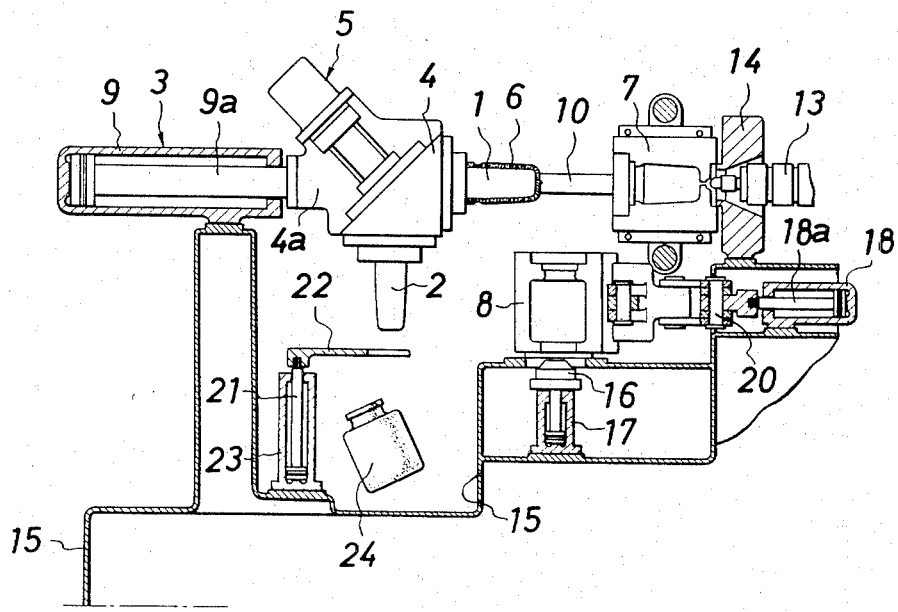
FIG. 4 is a view equivalent to FIG. 1, wherein a parison forming metal mold and the blow-molding metal mold are both opened, and a pedestal for mounting molding cores is retracted for delivering a product thus blow-molded on a molding core.
Figure 8:
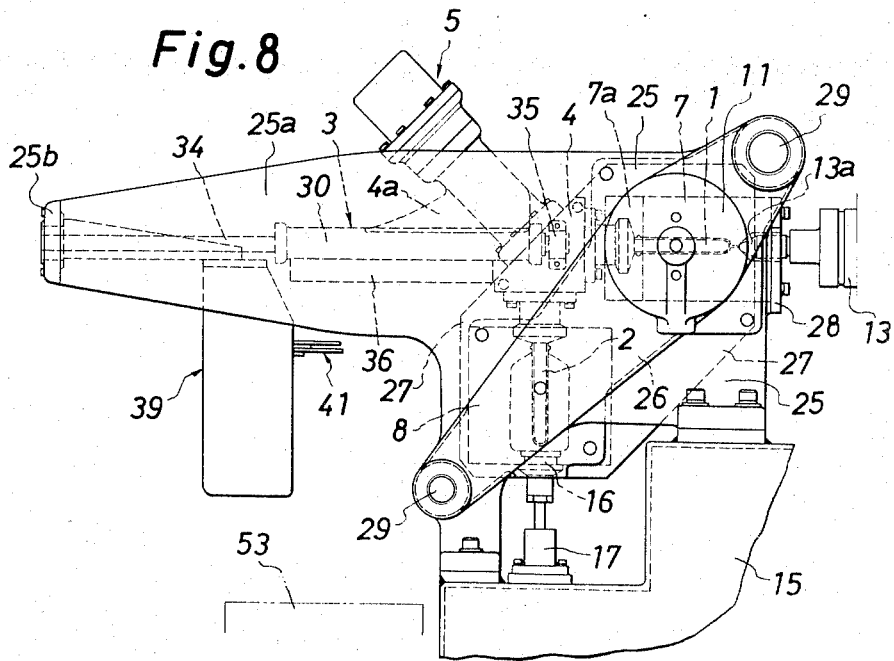
FIG. 8 is a fragmental elevational view showing an important part of the embodiment shown in FIG. 7.
Figure 9:
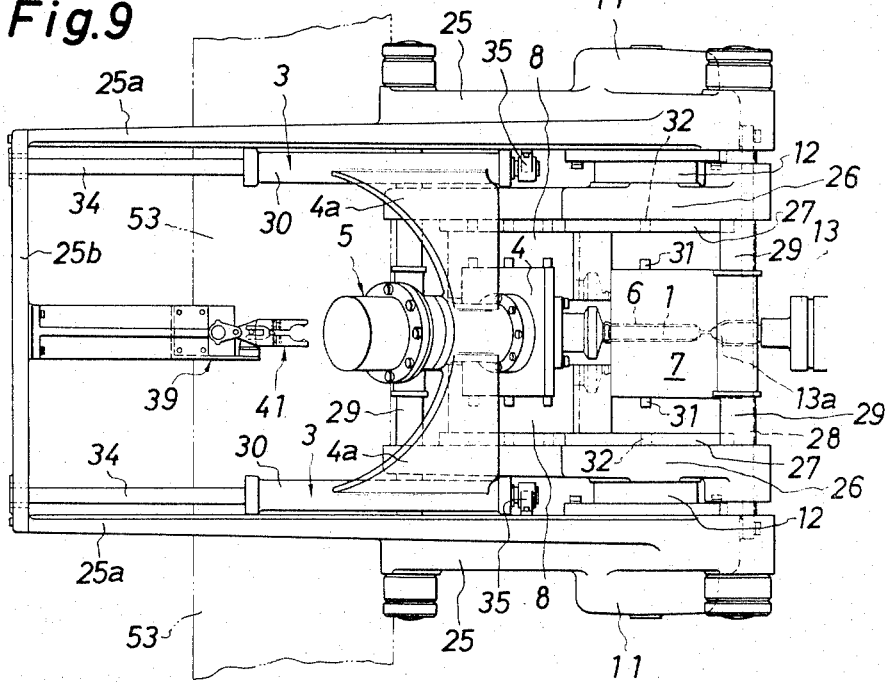
FIG. 9 is a fragmental plan view showing an important part of the embodiment shown in FIG. 7.
Figure 12:
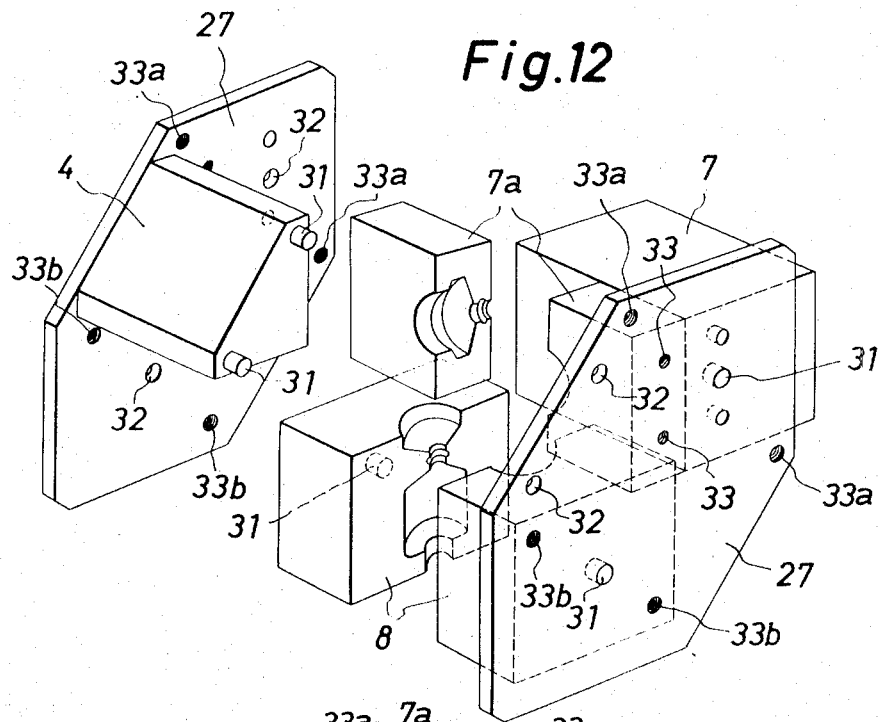
FIG. 12 is a schematic, exploded, perspective view showing the way of settings of two sets of metal molds and molding cores included in the embodiment shown in FIG. 7.

Referring now to FIGS. 1 through 6, there is indicated an embodiment of the invention wherein a parison forming metal mold and a blow-molding metal mold are opened and closed by two separate hydraulic devices. In this embodiment, there is provided a hydraulic cylinder 9 of a core shifting device 3, including a plunger 9a. One end of the plunger 9a is coupled to a seating member 4a for supporting a molding core supporting pedestal 4 and a rotating device 5. Under the operation of the plunger 9a, the core mounting pedestal 4 supported on the seating member 4a is advanced or retracted along tie-bars 10, 10 for guiding the seating member 4a.

Two mold-halves of a parison forming metal mold 7 are fixed respectively to horizontally extended rams 12, 12 of hydraulic devices 11, 11 supported on the tie-bars 10, 10 as shown in FIG. 5, and an injection device 13 protruding through a fixed plate 14 is nozzle-touching the parting line between the mold-halves. A blow-molding metal mold 8 is mounted vertically on the apparatus frame 15, and a hydraulic device 17 including a ram 16 is provided below the metal mold 8 so that a parison formed around a molding core and inserted in the metal mold 8 is pinched between the tip of the mold-core and the upper surface of the ram 16. Furthermore, the blow-molding metal mold 8 is, at one side thereof, coupled to a plunger 18a included in a hydraulic cylinder 18 arranged below the injection device 13 as is best seen in FIG. 6, and is made openable horizontally swinging around a pin 20 under the operation of the plunger 18a and two arms 19, 19.

Below the retracted position of the core pedestal 4, there is also provided a hydraulically operated stripping device 23 comprising a plunger 21 and a stripper plate 22 fixed to the upper end of the plunger 21 and having a bifurcated end for stripping the product out of the molding core.

The injection and blow-molding operation of the device constituting the first embodiment of this invention will now be described sequentially with reference to FIGS. 1 through 4.

FIG. 1

In the parison forming metal mold 7, a parison 6 is formed on the molding core 2 by the injection of a synthetic material. The plunger 9a is then retracted together with the core mounting pedestal 4. The pedestal 4 is then rotated by the rotating device 5 through an angle of 180°, so that the parison 6 thus formed around the molding core 2 is brought into the vertical position.

FIG. 2

The plunger 9a is then advanced together with the core mounting pedestal 4 to its initial position. The molding core 1 is then inserted into the parison forming metal mold 7 which is thereafter clamped, and simultaneously, the molding core 2 bearing the parison 6 is inserted into the blow-molding metal mold 8 which is then clamped.

FIG. 3

In the parison forming metal mold 7, a molten material is injected through the injecting device 13, and in the blow-molding metal mold 8, air is forcibly passed through the molding core 2, whereby a parison 6 and a blow-molded product 24 are produced simultaneously in these two metal molds 7 and 8.

FIG. 4

Both of the metal molds 7 and 8 are opened, and the core mounting pedestal 4 is retracted by means of the plunger 9a. At this time, the product 24 formed on the molding core 2 is engaged with the bifurcated end of the stripper plate 22, beforehand elevated to the corresponding position, whereby the product 24 is removed from the molding core 2. When the core mounting pedestal 4 is again rotated by 180°, the status of the members is setback to the original condition as indicated in FIG. 1.

In FIGS. 7 through 17, there is indicated another embodiment of the invention, wherein the parison forming metal mold and the blow-molding metal mold are open- or closed by means of a commonly provided hydraulic device.

As is apparent from these drawings, the embodiment comprises a core mounting pedestal 4 having a cross-sectional configuration substantially equal to an equilateral right-angled triangle and being rotatable around the bisector of the right-angled apex angle, a rotating device 5 of hydraulic type for interchanging the positions of the molding cores 1 and 2 mounted respectively on a vertically disposed surface $a$ and a horizontally disposed surface $b$ of the core mounting pedestal 4 to other symmetrically disposed positions by rotating the pedestal 4 by 180° around the above-mentioned bisector, a set of parison forming metal mold 7 and a neck mold 7a thereof combined into a block, and a blow-molding metal mold 8, all these members being arranged between two side frames 25, 25 disposed on both sides of the apparatus base 15.

The neck mold 7a and the blow-molding metal mold 8 are separable into two mold-halves, respectively, and the both side mold-halves are respectively fixed to two setting base plates 27, 27 in such a manner that the relative positions of the corresponding mold-halves are all precisely determined. Each of the setting base plates 27, 27 is in turn fixed to one of mold clamping plates 26, 26 arranged inwardly of the side frames 25, 25.

The core mounting pedestal 4 is fixedly mounted on a seating member 4a which is in turn slidably mounted along two guide rods 34, 34 extended horizontally along the inside of two frame arms 25a, 25a projected rearwardly from the two side frames 25, 25. More specifically, one end of each guide rod 34 is fixed to a joining plate 25b interconnecting two free ends of the frame arms 25a, 25a, and the other end of the guide rod 34 is fixed to a bracket 35 projecting inwardly from the inner surface of each frame 25. The guide rod 34 is operable as a stationary piston rod included in a movable cylinder 30 which is thereby made shiftable along the guide rod 34.

The transversely extended ends of the seating member 4a are integrally formed into hydraulic cylinders 30, 30, and when a pressurized fluid is supplied from hydraulic blocks 36, 36 disposed underneath the cylinders 30, 30 to the same cylinder, the seating member 4a is shifted forwardly or backwardly together with the cylinders 30, 30.

As described before, the neck mold 7a and the blow-molding metal mold 8 are separable into two mold-halves, respectively, and the both side mold-halves are fixed respectively to two setting base plates 27, 27 in such a manner that the relative position of the corresponding mold-halves are determined precisely. On the other hand, the parison forming metal mold 7 is not separable and is attached to a central position on a die-plate 28 extended trasversely between the side frames 25, 25.

However, if the parison forming metal 7 is made separable into two mold-halves, the above-mentioned neck mold 7a is not used, and the two mold-halves of the parison forming metal mold 7 are attached to the two base plates 27, 27, respectively.

The setting base plates 27, 27 are further fixed onto the inner surfaces of two mold clamping plates 26, 26 slidably supported on two tie-rods 29, 29 extended trasversely, at diagonally upper and lower positions, between the two side frames 25, 25. The mold clamping plates 26, 26 are coupled to two mold clamping hydraulic rams 12, 12 operable in two hydraulic cylinders 11, 11 formed integral with the side frames 25, 25, respectively, at positions near the parison forming metal mold 7.

When pressurized fluid is introduced into the hydraulic cylinders 11, 11, the mold clamping rams 12, 12 are shifted inwardly together with the mold clamping plates 26, 26, and the mold-halves of the neck 7a and the parison forming metal mold 8, fixed respectively to two mold setting base plates 27, 27, are thereby closed.

Through the mold setting base plates 27, 27, there are provided holes 32, 32, ... of a number corresponding to the number of pins 31, 31, ... which are provided on the side surfaces of the above-mentioned metal molds and also of the core mounting pedestal 4 and other holes 33, 33a, 33b for screw mounting the metal molds on the base plates 27, 27 and for other purposes. The holes 32, 32, ... in cooperation with the pins 31, 31, ... serve to determine the positions of the core mounting pedestal 4 and other metal molds temporarily on the base plates 27, 27.

The above-mentioned temporarily setting is carried out for utilizing the base plates 27, 27 as the reference member in the case of mounting the core mounting pedestal 4, parison forming metal mold 7, and the neck mold 7a on the base plate 27, 27, and for determining the relative positions of these three members before these are ultimately fixed to the mold clamping plates 26, 26. Through these procedures, any possibility of causing errors in the relative positions of the three members when these members are assembled into the mold clamping device can be substantially eliminated. It should be noted that the positions of the above described pins 31, holes 32, metal molds fixing holes 33, 33, ..., 33b, 33b, ... an the base plate fixing holes 33a, 33a, ... are accurately determined based on the design threaded of these members and related components.

Figure 13:
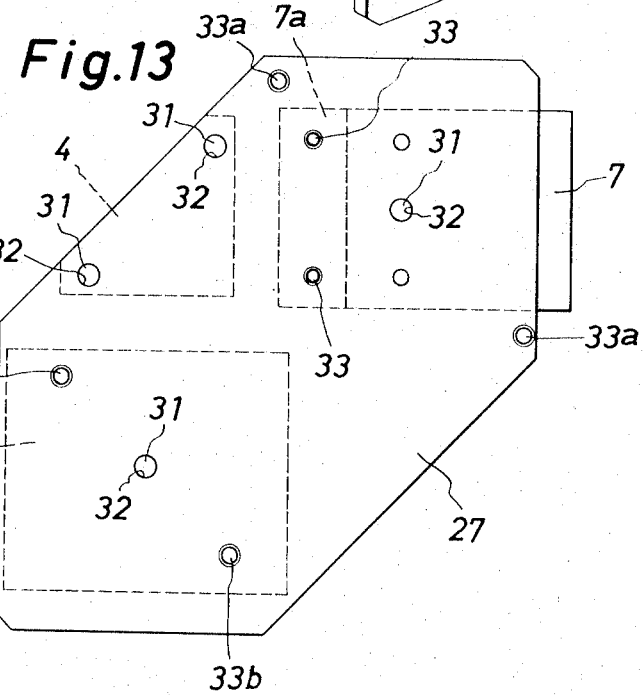
FIG. 13 is a schematic front side, elevational view showing the settings.

FIG. 13 indicates a state wherein the core mounting pedestal 4, parison forming metal mold 7, neck mold 7a, and the blow-molding metal mold 8 are all positioned on the mold setting base plate 27 utilizing pins 31, 31, ... and holes 32, 32, ... engaging therewith. Within these members, the neck mold 7a and the blow-molding metal mold 8 are fixed to the inner surface of the base plate 27 employing the mold setting holes 33, 33, ... and one part of holes 33b, 33b, .... However, the core mounting pedestal 4 and the parison forming metal mold 7 are left in the temporarily fixed condition using the pins 31, 31, ... and holes 32, 32, ....

Figure 14:
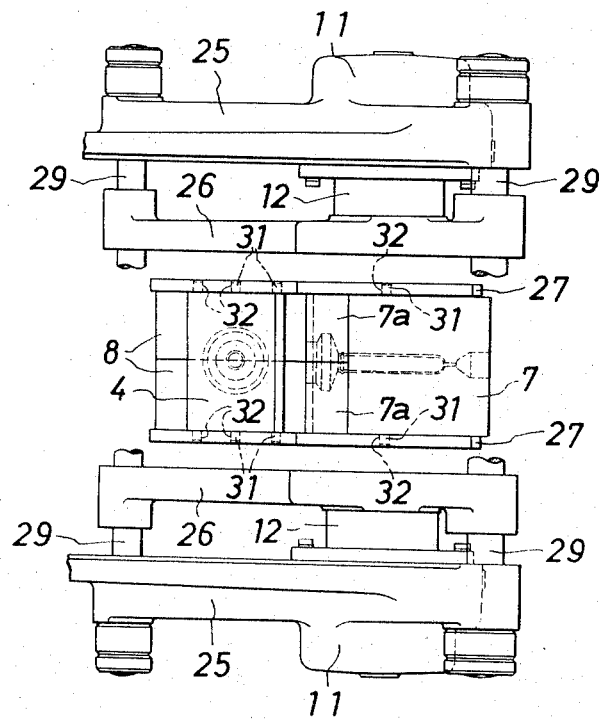
FIG. 14 is a plan view showing the way of fixing the two sets of metal molds between the two mold clamping plates, schematically.
Figure 15:
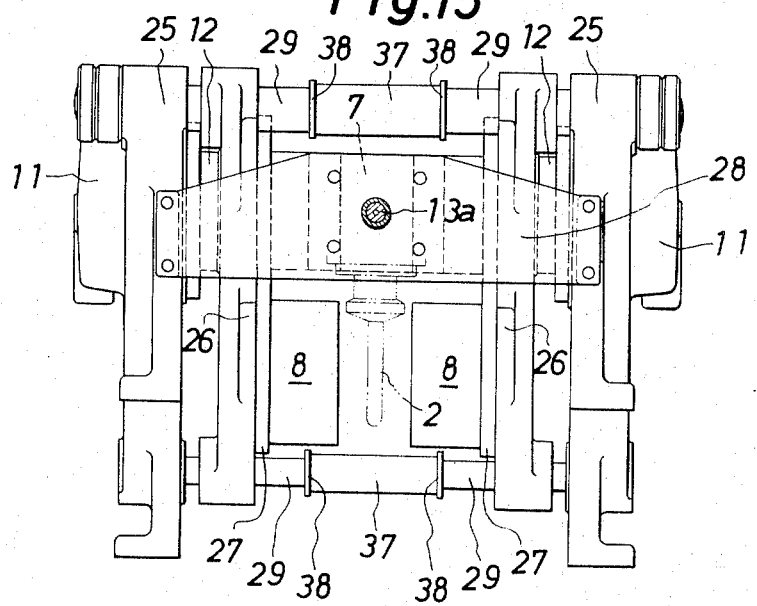
FIG. 15 is a front side elevational view, observed along the line XV—XV in FIG. 11, of the mold clamping device.
Figure 16:
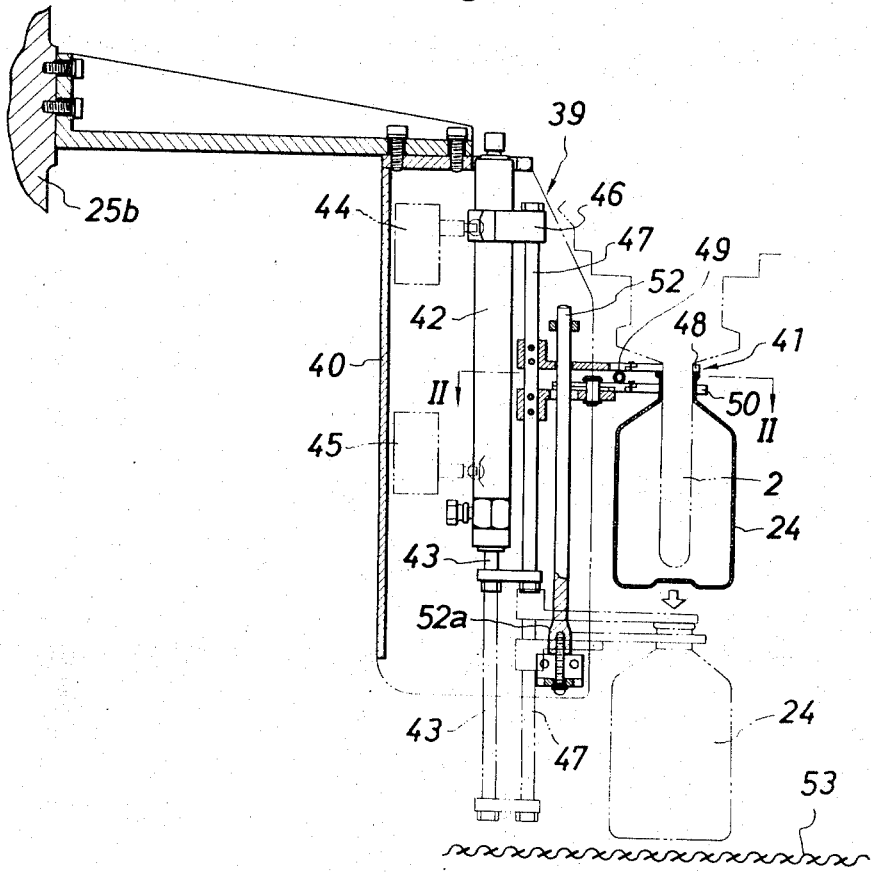
FIG. 16 is an elevational view, partly in section, of a product removing device which removes the product from a molding core.
Figure 17:
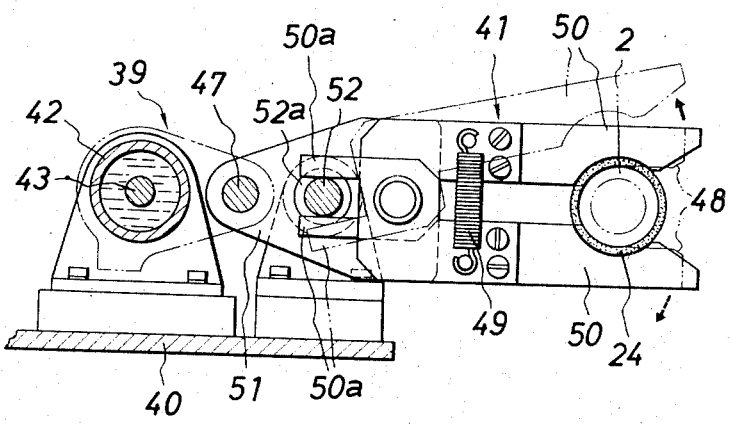
FIG. 17 is a plan view, partly in section, observed along the line XVII—XVII in FIG. 16.

In FIG. 14, there is indicated a state in which the mold setting base plates 27, 27 thus assembled temporarily are placed between sufficiently opened mold clamping plates 26, 26 employing, for instance, a small crane. Before placing the base plates 27, 27 thus assembled between the mold clamping plates, the hydraulic device for operating the mold clamping plates 26, 26 must be adjusted so that the parting lines of the metal molds 7a and 8 align with the center line of the molding core to be mounted on the core mounting pedestal 4.

A collar 37 fitted over the central portion of each tie-rod 29 is provided to serve as a rule for adjusting the displacements of the mold clamping plates 26, 26. Both ends of the collar 37 are equally spaced from the center of the tie-rod 29, and the strokes of the hydraulic rams 12, 12 are adjusted at positions where the mold clamping plates 26, 26 are brought into contact with rings 38, 38 provided adjacent to the ends of each collar 37.

As a result of this adjustment, the strokes of the hydraulic rams 12, 12 are equalized regardless of the existence of the metal molds between the mold setting base plates 27, 27, whereby undesirable displacement of the mold clamping position is eliminated and any possibility of damaging the molding core and metal molds owing to uneven mold clamping forces applied to the metal molds can be substantially reduced.

The connection of the mold setting base plates 27, 27 thus placed between the mold clamping plates 26, 26 as shown in FIG. 14 and the mold clamping plates 26, 26 themselves is carried out in a condition wherein the mold setting base plate 27, 27 are firmly held between the mold clamping plates 26, 26 under the compressive forces of the hydraulic rams 12, 12. The connection is performed by means of bolts driven into one part of the mold mounting holes 33b, 33b, ... and the base plate mounting holes 33a, 33a, ... and nuts. As a result of this connection, the mold setting base plates 27, 27 together with the halves of the neck mold 7a and the blow-molding metal mold 8 are rigidly fixed to the mold clamping plates 26, 26.

Furthermore, the core mounting pedestal 4 and the parison forming metal mold 7 temporarily fixed to the mold setting base plates 27, 27 as described before are connected to the corresponding mounting members under the closed condition of the metal molds. For instance, the core mounting pedestal 4 is connected to the lower end of the rotating shaft of the rotating device 5 mounted on the seating member 4a at an angle of 45° in a manner that the rear surface of the pedestal 4 abuts with the lower end, and the parison forming metal mold 7 is fixed to the central portion of the die-plate 28 at a position through which the nozzle 13a of the injection device 13 projects.

The core mounting pedestal 4 and the parison forming metal mold 7 thus fixed to the respective supporting members will be kept on the mounted positions even after the retraction of the mold setting base plates 27, 27 together with the mold-halves of the neck mold 7a and the blow-molding metal mold 8 without falling down from the base plates 27, 27. Furthermore, since all of these members are strictly kept to their relative positions as described before, the molding cores 1 and 2 when these are mounted on the surfaces a and b of the core mounting pedestal 4, respectively, are positioned at the center of the corresponding metal molds, and the center lines of these core will not be departed from the parting lines of these metal molds even if the cores are rotated by the rotating device 5 around the rotating axis of the pedestal 4 through an angle of 180°.

The core mounting pedestal 4 is mounted on the seating member 4a formed integral with the hydraulic cylinders 30, 30, and when the hydraulic cylinders 30, 30 are shifted along the guiding rods 34, 34, the core mounting pedestal 4 is reciprocated between a position engaging with the metal molds and another position at which is located a product removing device 39.

The product removing device 39 is constructed substantially similar to that indicated in the first embodiment of this invention, and is operated hydraulically. The device 39 comprises a stationary member 40, a product clamping mechanism 41, a hydraulic cylinder 42 attached to a top plate of the stationary member 40 and is disposed vertically, a plunger 43 included in the hydraulic cylinder 42 and operable in lifting and lowering the product clamping mechanism 41, and a movable lever 47 connected to the plunger 43 and extended in parallel to the cylinder 42. A member for operating limit switches 44, 45 is provided on an end of the movable lever 47, and the product clamping mechanism 41 is mounted at a suitable position on the movable lever 47.

The product clamping mechanism 41 includes a pair of claws 48, 48 to be loosely slipped over the stem portions of the core and a pair of product clamping pieces 50, 50, in an up-and-down relationship, and is fixedly mounted on the movable lever 47 through a seating member 51 which is coupled to pivoting points of the claws and the clamping pieces. In the device 39, there is further provide a guiding rod 52 extending in parallel with the plunger 43. The guiding rod 52 is further inserted between the rear ends 50a, 50a of the product clamping pieces 50, 50, and when the rear ends 50a, 50a, are forced outwardly by a tapered portion 52a provided near the lower end of the guiding rod 52, the product clamping pieces 50, 50 are opened around the pivotal point, whereby the product 24 thus blow-molded is delivered from the molding core.

In the embodiment of this invention, when the core mounting pedestal 4 mounted on the seating member 4a is shifted forwardly by means of the hydraulic cylinders 30, 30, the mold clamping plates 26, 26 are compressed inwardly under the operation of the hydraulic rams 12, 12, and the neck mold 7a and the blow-molding metal mold 8 are thereby closed. When these metal molds are closed, the molding cores 1 and 2 are located in alignment with the center lines of these metal molds, and a molten material is injected from the injecting device nozzle-touching the parison forming metal mold 7 thereby to form a parison 6. In the blow-molding metal mold 8, a pairson 6 formed around the molding core 2 is blown into a product 24 by air supplied from the tip of the molding core 2.

The metal molds in which a parison 6 and a product 24 are thus formed simultaneously, are then opened laterally under the retraction of the hydraulic rams 12, 12, and the molding cores 1 and 2 bearing the parison 6 and the product 24, respectively, are retracted backwardly on the core mounting pedestal 4. At the retracted position, the product 24 is removed by means of the product removing device 39, and the core mounting pedestal 4 is rotated by 180° by means of the rotating device 5. As a result, the molding core 1 bearing the parison 6 is now disposed vertically and the core 2 is disposed horizontally.

When the core mounting pedestal 4 is advanced again, the core 1 bearing the parison 4 is brought into a position between the mold-halves of the blow-molding metal mold 8, and the core 2 is inserted between the mold-halves of the neck mold 7a and in parison forming metal mold 7.

As will be apparent from the above description, according to the present invention, the formation of a parison and the blow-molding thereof can be realized simultaneously by advancing and rotating the core mounting pedestal supporting the molding cores disposed horizontally and vertically. That is, the formation of a parison can be carried out when the molding core is extended horizontally, and the blow-molding of the parison can be carried out when the core supporting the parison is extended vertically, and by this procedure, blow-molded articles of uniformly distributed thicknesses can be produced continually.

What is claimed is:

1. An injection blow-molding apparatus comprising a core mounting pedestal having vertically and horizontally extended surfaces for mounting thereon molding cores each having a blowing hole therethrough, a rotating device for rotating the core mounting pedestal around a bisector of an apex angle formed between said two surfaces so that the molding cores mounted on the pedestal are thereby shifted between symmetrically arranged positions angularly spaced by 180°, a hydraulic device for moving the core mounting pedestal forwardly and backwardly, a parison forming metal mold for receiving the horizontally disposed molding core and a blow-molding metal mold for receiving the vertically disposed molding core together with a parison formed thereon, another hydraulic device for opening, closing, and clamping said metal molds, and an injection device nozzle touching the parison forming metal mold.

2. An injection blow-molding apparatus comprising: a pair of frames oppositely disposed at both sides of an apparatus base; a pair of tie-rods extended between said two frames at diagonally located two positions; a pair of mold clamping plates slidably supported on said two tie-rods; a pair of hydraulic cylinders provided integral with said two frames, each including a hydraulic ram; said mold clamping plates being firmly connected to said hydraulic rams; a parison forming metal mold and a blow-molding metal mold both separable into two mold-halves connected to said mold clamping plates, respectively; two guiding rods operable as stationary pistons extended inwardly along said two frames; two hydraulic cylinders slidably mounted on said two guiding rods; a seating member formed integral with said hydraulic cylinders; a hydraulically rotating device mounted on said two guiding rods; a seating member formed integral with said hydraulic cylinders; a hydraulically rotating device mounted on said seating member at an angle of 45°; and a core mounting pedestal fixed to the lower part of said rotating device; said core mounting pedestal having two surfaces extended horizontally and vertically and a third surface extended obliquely thus forming an equilateral right-angular triangle in its cross-section, said two surfaces for mounting molding cores being directed toward said two metal molds, and said third surface being coupled to said lower part of the rotating device.

3. An injection blow-molding apparatus as set forth in claim 2 wherein mold setting base plates are further provided for setting the relative positions between the parison forming metal mold, blow-molding metal mold, and the core mounting pedestal before these members are finally fixed to the designed positions, and said members are fixed to said mold clamping plates through said mold setting base plates.

4. An injection blow-molding apparatus as set forth in claim 2 wherein members such as collars are provided on each of said two tie-rods extended between said frames at diagonally located upper and lower positions so that the movements of the mold clamping plates are thereby restricted and the strokes of said hydraulic rams are thereby adjusted.

5. An injection blow-molding apparatus as set forth in claim 2 wherein said parison forming metal mold is formed by a neck mold separable into two mold-halves and a single block of the parison forming metal mold, and while the two halves of the neck mold are respectively fixed to said mold clamping plates, the single block of the parison forming metal mold is fixed to a die-plate provided at the injection device side of the frames.

6. An injection blow-molding apparatus as set forth in claim 1 wherein a product removing device hydraulically operable is further provided under the retracted position of said core mounting pedestal which is shifted horizontally by the hydraulic device.

7. An injection blow-molding apparatus as set forth in claim 2 wherein said frames are provided at both sides of said apparatus base, and a belt conveyor is disposed under the product removing device suspended underneath the backward ends of said arms.

8. An injection blow-molding apparatus as set forth in claim 2 wherein said hydraulic devices for the mold clamping plates on which said parison forming metal mold and said blow-molding metal mold, both being separable into two mold-halves, are fixed are provided on said frames at positions near said parison forming metal mold.

* * * * *